(12) United States Patent
Marion

(10) Patent No.: US 9,703,981 B1
(45) Date of Patent: Jul. 11, 2017

(54) MOBILE DEVICE DATA ENCRYPTION

(71) Applicant: MOBILE IRON, INC., Mountain View, CA (US)

(72) Inventor: Eric M. Marion, San Francisco, CA (US)

(73) Assignee: MOBILE IRON, INC., Mountain View, CA (US)

( * ) Notice: Subject to any disclaimer, the term of this patent is extended or adjusted under 35 U.S.C. 154(b) by 285 days.

(21) Appl. No.: 14/533,006

(22) Filed: Nov. 4, 2014

Related U.S. Application Data

(60) Provisional application No. 61/899,403, filed on Nov. 4, 2013.

(51) Int. Cl.
*G06F 3/00* (2006.01)
*G06F 21/62* (2013.01)
*G06F 21/64* (2013.01)
*G06F 21/78* (2013.01)

(52) U.S. Cl.
CPC .......... *G06F 21/6227* (2013.01); *G06F 21/64* (2013.01); *G06F 21/78* (2013.01)

(58) Field of Classification Search
CPC ... H04L 63/0428; H04L 9/0836; H04L 69/22; H04L 2209/20; H04L 2209/60; H04L 69/04; H04L 9/0637; H04L 63/164; H04L 63/166; H04L 12/5601; H04L 2209/30; H04L 2209/34; H04L 2209/605; H04L 2209/606
USPC .............................. 380/30, 45; 713/187, 189
See application file for complete search history.

(56) References Cited

U.S. PATENT DOCUMENTS

| | | | | |
|---|---|---|---|---|
| 6,064,736 | A * | 5/2000 | Davis ...................... | G06F 21/31 380/30 |
| 6,754,349 | B1 * | 6/2004 | Arthan .................. | H04L 9/0894 380/268 |
| 8,000,472 | B2 * | 8/2011 | Suga ...................... | H04L 9/0836 380/40 |
| 2002/0194209 | A1 * | 12/2002 | Bolosky ............ | G06F 17/30097 |
| 2004/0177272 | A1 * | 9/2004 | Walters ................... | G06F 21/46 713/183 |
| 2005/0117746 | A1 * | 6/2005 | Benaloh .................. | G06F 21/10 380/30 |
| 2007/0266258 | A1 * | 11/2007 | Brown .................. | H04L 9/0822 713/183 |
| 2008/0148042 | A1 * | 6/2008 | Brown .................... | H04L 63/06 713/154 |

(Continued)

*Primary Examiner* — Joseph P Hirl
*Assistant Examiner* — Sayed Beheshti Shirazi
(74) *Attorney, Agent, or Firm* — Van Pelt, Yi & James LLP

(57) ABSTRACT

Mobile device data encryption is disclosed. A file is divided into a plurality of data blocks. The data blocks are encrypted. An authentication value is generated for each encrypted data block. The encrypted data blocks are stored in a tree data structure including the encrypted data blocks and a header block. The header block includes a set of authentication values and an aggregate authentication value. Each authentication value in the set of authentication values is derived from one or more of the encrypted data blocks. The aggregate authentication value is generated based at least in part on the set of authentication values. In various embodiments, the tree data structure may include one or more levels of internal nodes including authentication blocks.

19 Claims, 10 Drawing Sheets

(56) References Cited

U.S. PATENT DOCUMENTS

| | | | | |
|---|---|---|---|---|
| 2008/0313721 A1* | 12/2008 | Corella | ................... | G06F 21/31 726/6 |
| 2011/0246783 A1* | 10/2011 | Unagami | .............. | G06F 21/556 713/187 |
| 2013/0117575 A1* | 5/2013 | Kataoka | ................ | G06F 21/602 713/189 |

* cited by examiner

MOBILE DEVICE DATA ENCRYPTION

CROSS REFERENCE TO OTHER APPLICATIONS

This application claims priority to U.S. Provisional Patent Application No. 61/899,403, entitled MOBILE DEVICE DATA ENCRYPTION filed Nov. 4, 2013 which is incorporated herein by reference for all purposes.

BACKGROUND OF THE INVENTION

Existing mobile device data storage systems tend to secure and store files in a way that is inefficient. For example, many mobile device data storage systems secure files by directly encrypting the entire file. In this case, the entire file is decrypted and/or re-encrypted upon each file access. Directly encrypting and/or decrypting an entire file may require significant processing overhead thereby reducing storage system performance, especially when a file is large. In addition, many existing techniques used to verify the integrity and/or authenticity of a file may be circumvented in certain situations, especially in the case of mobile devices. It would be useful if a scheme for securely storing file data could be developed that would reduce processing overhead and/or allow for reliable determination of file integrity.

BRIEF DESCRIPTION OF THE DRAWINGS

Various embodiments of the invention are disclosed in the following detailed description and the accompanying drawings.

DETAILED DESCRIPTION

Figure 1:
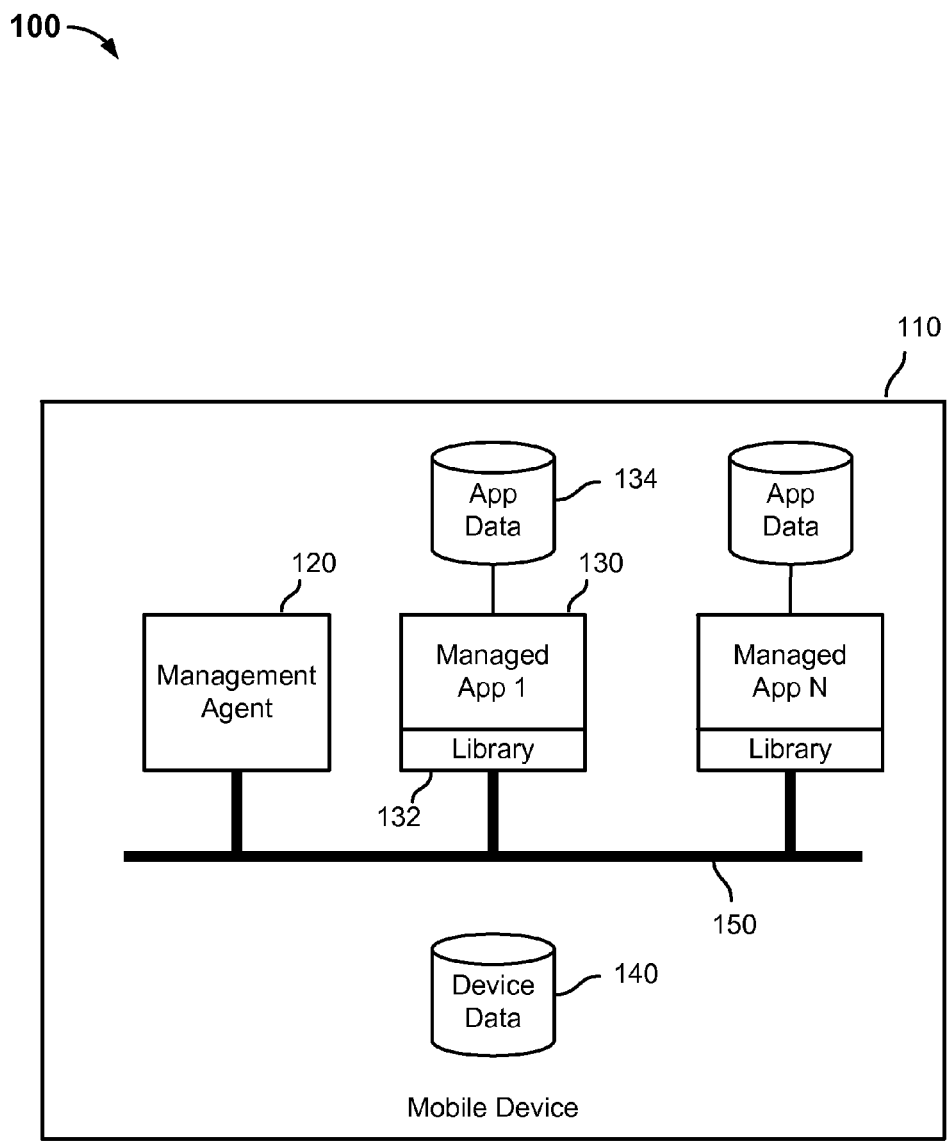
FIG. 1 is a block diagram illustrating embodiments of a system to securely store data on a mobile device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Mobile device data encryption is disclosed. In various embodiments, secure files, secure directories, and/or other sets of data in mobile device are each represented by an encrypted file in the mobile device file system. The encrypted file may include individually encrypted blocks stored in a tree data structure, such as an imbalanced tree structure. The tree data structure may include a root node including a header block and one or more leaf nodes including the encrypted data blocks. In various embodiments, the tree data structure includes one or more levels of internal nodes comprising authentication blocks. In some embodiments, the tree data structure may be flattened to generate a series blocks, and the series of blocks are stored in the mobile device memory.

In various embodiments, a file is divided into a plurality of data blocks. The data blocks are encrypted. An authentication value is generated for each encrypted data block. The encrypted data blocks are stored in a tree data structure including the encrypted data blocks and a header block. The header block includes a set of authentication values and an aggregate authentication value. Each authentication value in the set of authentication values is derived from one or more of the encrypted data blocks. The aggregate authentication value is generated based at least in part on the set of authentication values. In various embodiments, the tree data structure may include one or more levels of internal nodes including authentication blocks.

FIG. 1 is a block diagram illustrating embodiments of a system to securely store data on a mobile device. In the example shown, a system 100 includes a mobile device 110, management agent 120, managed application(s) 130, mobile device data storage 140, and/or other components. The mobile device 110 may include a smartphone, tablet, and/or any other type of mobile device. The mobile device 110 may include components such as a management agent 120, one or more managed applications 130, and/or other components. In certain cases, the managed applications 130 are managed by the device management agent 120. Managed applications 130 may include and/or be modified to include a library 132. The library 132 may be, for example, compiled into the application, injected into the application, added to the application by wrapping, added as a software development kit (SDK), and/or otherwise added to a managed application 130. The library 132 may configure the managed application 130 for use in a mobile device management (MDM) environment by, for example, allowing the device management agent 120 to control the managed application 130 and/or perform actions on behalf of the managed application 130. In certain cases, the device management agent 120 provides information to and/or receives information from the managed applications 130 via a secure application communication bus 150.

In some embodiments, a mobile device data storage 140 may include a global storage, shared file storage, shared directory, and/or other type of storage for the mobile device 110 (e.g., as a whole). In certain cases, the device data storage 140 includes a secure digital (SD) card for the device 110. In various embodiments, managed applications 130 may include and/or be associated with an application data storage 134. The application data storage 134 may include a private data storage, directory, and/or file store for the managed application 134. In certain cases, an application data storage 134 is only accessible to and/or private to one managed application 130. In other cases, an application data storage 134 is accessible to multiple managed applications 130 including, for example, a set of managed applications. In certain cases, the application data storage 134 includes a sub-storage within the device data storage 140.

In various embodiments, file encryption for the secure application communication bus 150 includes two layers. A key management layer manages encryption keys for the device 110, applications 130, application files, and/or other data associated with the device 110. An encryption layer reads and writes encrypted files. The encryption layer in various embodiments provides typical file system functionality. It provides the ability to discover, create and delete secure folders, and the ability to discover, create, read, write, delete, and get and set metadata about secure files in the secure folders. In various embodiments, secure filenames and secure paths are not revealed in the device file system. In some embodiments, secure file sizes are partially obscured in the device file system. In some embodiments, file names may not be encrypted and/or obscured.

In some embodiments, a library 132, the secure application connection bus 150, and/or other components are configured to encrypt files for storage in the device data storage 140, application data storage 132, and/or any other storage on the mobile device 110. In certain cases, a library 132 associated with a managed application 130 encrypts and/or decrypts files using the techniques disclosed herein. The encrypted files are stored in the application data storage 134, device data storage 140, and/or other data storage on the device 110. The device data storage 140, application data storage 134, and/or other data storage on the device 110 may include a file system. As discussed in detail below, files, directories, and/or other data are encrypted and otherwise processed for storage in a tree data structure including multiple blocks. The tree data structure may include, for example, an imbalanced tree data structure, such as a lop-sided asymmetric tree. The blocks included in the tree data structure include at least a header block and one or more individually encrypted data blocks. Depending, for example, on the size of the file and/or other criteria, the tree data structure may also include one or more levels of internal nodes including authentication blocks. In various embodiments, the tree data structure is flattened into a series of blocks, and the series of blocks are stored in device data storage 140, application data storage 134, and/or other data storage on the device 110.

Figure 2:
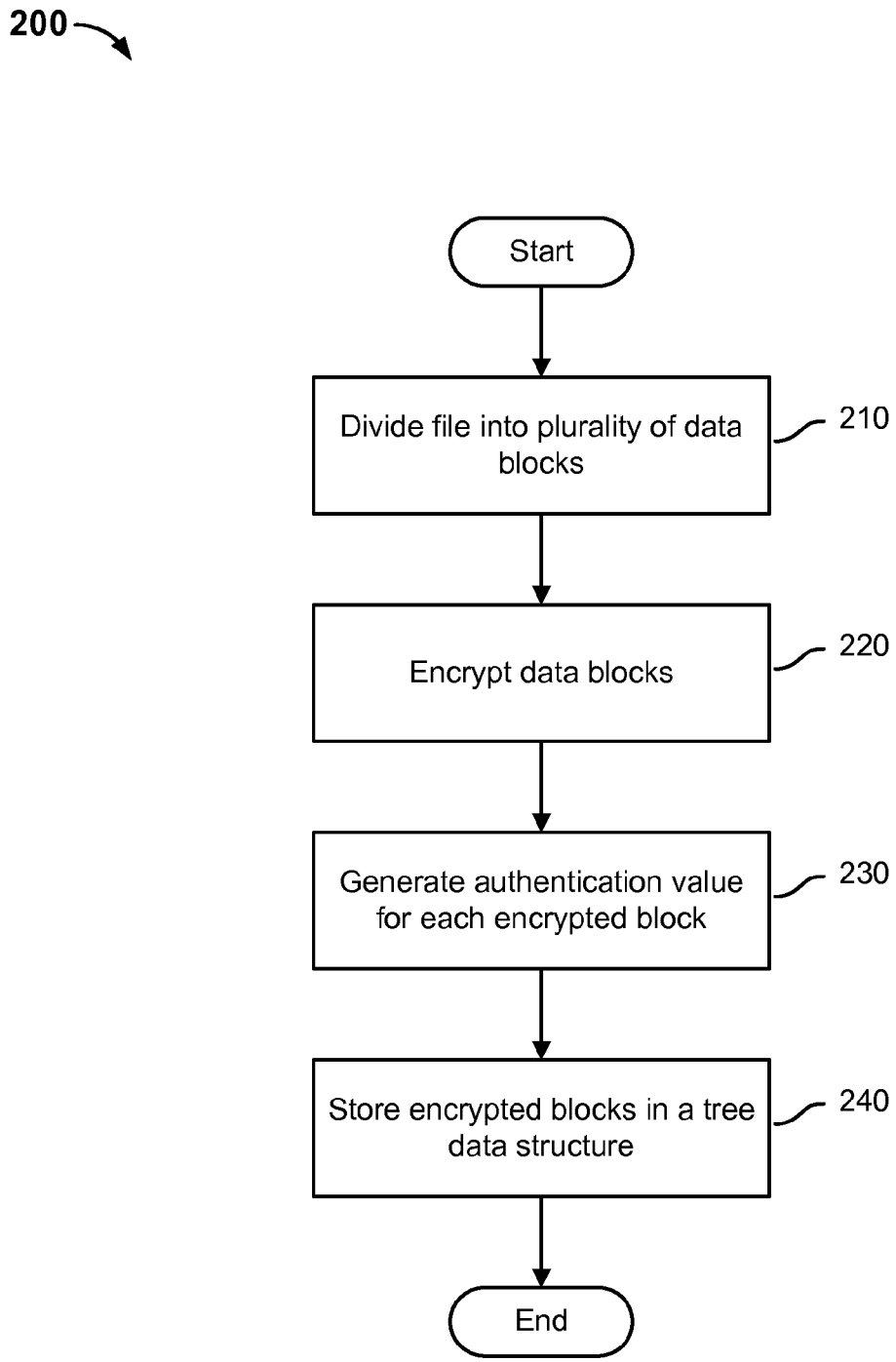
FIG. 2 is a flow chart illustrating embodiments of a process to securely store a file.

FIG. 2 is a flow chart illustrating embodiments of a process to securely store a file. At 210, a file is divided into a plurality of data blocks. In various embodiments, a file is divided into data blocks of equal size. For example, a file may be divided into four kilobyte blocks and/or blocks of another size. The size of the data blocks may be determined based on storage system characteristics/requirements (e.g., file system block size, flash storage block size, etc.), mobile device characteristics, and/or any other information.

At 220, data blocks are encrypted. In various embodiments, each data block is individually encrypted. Each data block may be encrypted using various encryption approaches including, for example, American Encryption Standard (AES), American Encryption Standard Cipher Block Chaining (AES-CBC) cipher algorithm, American Encryption Standard Galois/Counter Mode (AES-GCM), and/or any other encryption technique. The inputs to an encryption algorithm may include one or more of the content included in (a payload of) the data block, an encryption key, an initialization vector, and/or other information. In some embodiments, data blocks are encrypted using an encryption key derived from a master key, a master key, and/or any other type of key. In one example, each data block is encrypted using a same encryption key derived from a master key. A master key may include a master key associated with a file, a set of files, directory, an application, a mobile device user, and/or the mobile device. In some embodiments, an initialization vector is used to encrypt each data block. The initialization vector (e.g., a nonce) used to encrypt a data block may be unique to that data block. In some cases, an initialization vector is generated for each data block using, for example, a pseudo-random number generator and/or other random number generation approach. Using a unique initialization vector for each data block may ensure that cipher text for each encrypted data block is unique, may prevent against reordering the encrypted data blocks, and/or prevent against certain threat vectors.

At 230, an authentication value is generated for each encrypted data block. An authentication value is generated based on the cipher text included in an encrypted block, the plaintext of the encrypted block, and/or other information associated with the encrypted data block. By way of example, an authentication value may include a hash of the encrypted data block, a message authentication code (MAC) for the encrypted data block, a keyed-hash message authentication code (HMAC) for the encrypted data block, an AES-GCM authentication tag for the data block, and/or any other authentication information. In one example, a cryptographic hashing function, such as Secure Hashing Algorithm 256 (SHA-256), is used to generate an authentication value based on the contents of an encrypted data block. In another example, an HMAC operation is performed on an encrypted data block to generate an authentication value including an HMAC of the encrypted data. An HMAC algorithm (e.g., HMAC-SHA-256) may receive as inputs the cipher text comprising the encrypted data block, an authentication key, and/or other information. In various embodiments, the authentication key may include a key derived from a master key associated with the file, a directory including the file, one or more applications on a mobile device, a mobile device user, and/or a mobile device. In certain cases, the authentication key may be a separate key from the encryption key used to encrypt the data block. In certain cases, the authentication key, encryption key, and/or other keys may be derived from a same master key.

In some embodiments, data blocks are encrypted using an authenticated encryption approach. Employing an authenticated encryption technique, an authentication value may be generated for a data block, and the data block may be encrypted in a single operation and/or multiple related operations. In one example, data blocks are encrypted using AES-GCM. In this case, the plaintext of a data block is encrypted using an encryption key, an initialization vector generated for the data block, additional authenticated data (AAD), and/or other information. The output of the AES-GCM algorithm may include cipher text including the encrypted data block, an authentication tag, and/or other information. In this case, the authentication value includes the authentication tag. Using the AES-GCM algorithm, the data block is encrypted and an authentication value is generated in one operation.

In various embodiments, the data blocks are encrypted in a first operation and an authentication value for the encrypted data block is generated in a second operation. By way of example, data blocks may be encrypted using an AES encryption technique and an authentication value for the data block may be generated using an HMAC technique, such as SHA-256 HMAC.

At 240, the encrypted data blocks are stored in a tree data structure. In various embodiments, a tree data structure includes leaf nodes including encrypted data blocks, internal nodes including authentication blocks, and/or a root node including a header block. The process of storing encrypted data blocks in tree data structure is discussed in detail below.

Figure 3:
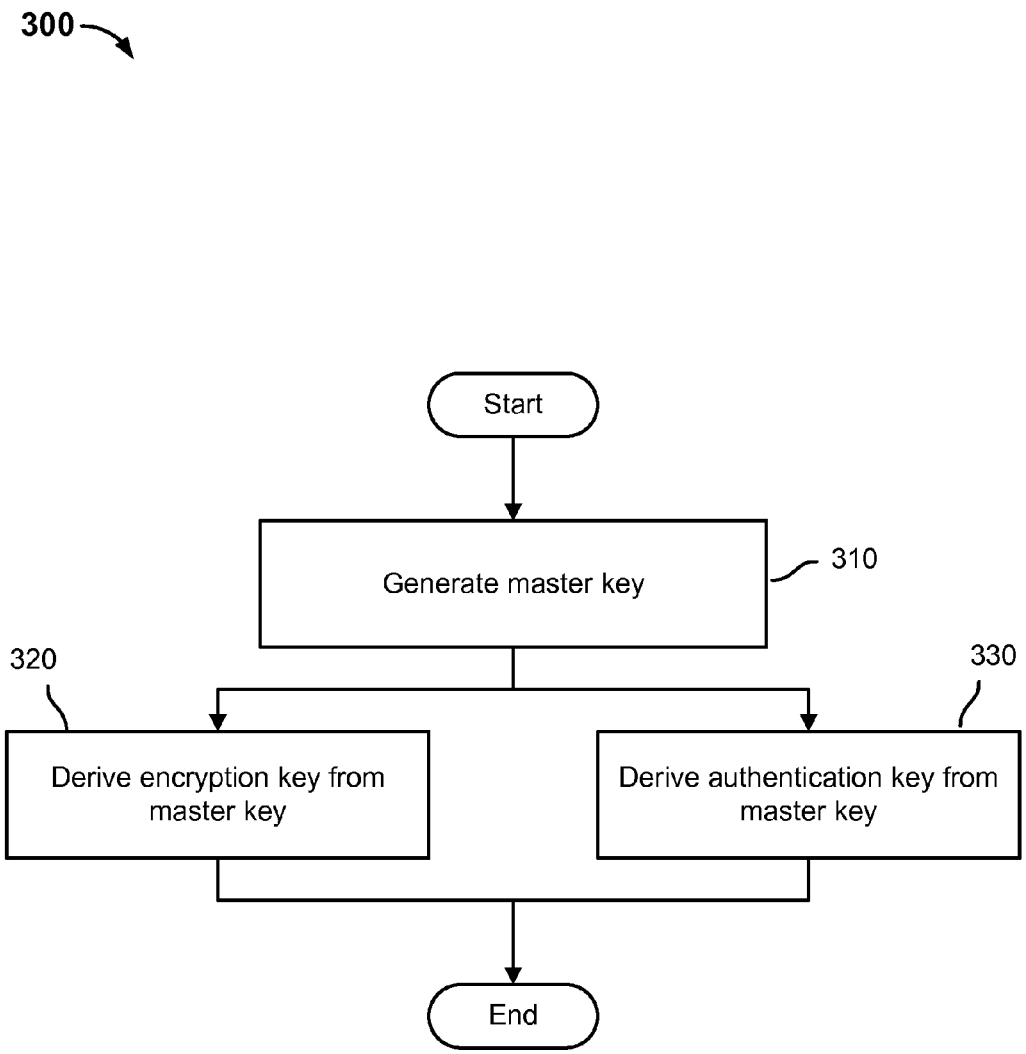
FIG. 3 is a flow chart illustrating embodiments of a process to generate keys.

FIG. 3 is a flow chart illustrating embodiments of a process to generate keys. At 310, a master key is generated. In various embodiments, a master key may be generated using any suitable key generation technique. In some cases, a master key may be generated using various random number generation techniques. In one example, a master key is generated using a cryptographically-secure pseudorandom number generator and/or other random number generation module. A master key may include a master key associated with a mobile device, an application, a set of applications, one or more files (e.g., application data files), a directory, a user profile, and/or information.

In various embodiments, one master is key is generated for each application on a device. The master key generated for an application may be used to encrypt and/or decrypt files associated with the application. Generating a master key for each application on a device may help to avoid potential vulnerabilities resulting from maliciously copying files from one application that is no longer authorized to another application that is still authorized.

At 320, an encryption key is derived from the master key. In various embodiments, an encryption key includes a key used to encrypt data blocks comprising a file, multiple files, a directory, and/or other set of data. In some cases, an encryption key is generated for an application on a mobile device, for each of one or more files stored on a mobile device, for each of one or more data blocks comprising a file, for each of one or more directories, for each of one or more sub-directories, and/or any other set of data.

An encryption key may be derived from the master key using any key derivation approach known in the art. In certain implementations, the encryption key is generated using an HMAC-based approach. For example, an HMAC algorithm may receive as inputs the master key, content including a string identifier (e.g., "Encryption Key"), and/or other information. The output of the HMAC may include the encryption key. In some implementations, the encryption key is generated by seeding a cryptographically-secure pseudorandom number generator with the master key. A portion (e.g., a first N bits) of the output of the pseudorandom number generator may include the encryption key. In one example, an encryption key is generated using Password-Based Key Derivation Function 2 ($PBKDF_2$). The $PBKDF_2$ may receive as inputs a pseudorandom function, the master key, a salt, a number of iterations, desired length of encryption key, and/or other information. The output of the $PBKDF_2$ includes the encryption key.

In some embodiments, a unique encryption key is generated for each file. In this case, a management agent (e.g., management agent 120 of FIG. 1) may store the per-file encryption key and may selectively share the per-file encryption key with applications and/or users of its choosing.

At 330, an authentication key is derived from the master key. In various embodiments, an authentication key includes a key used to generate authentication values for a file stored using the techniques disclosed herein. The authentication key may, for example, be used to generate authentication values for various blocks included in a tree data structure. For example, the authentication key may be used as input to an HMAC function to generate an authentication value for an encrypted data block, to generate an aggregate authentication value for a header block, and/or any other authentication value(s). In various embodiments, an authentication key may be derived from the master key using any suitable key derivation technique as discussed herein and/or known in the art.

In some embodiments (not shown), the steps of deriving an encryption key from a master key (step 320) and deriving an authentication key from the master key (step 330) are performed in series. In one example, an encryption key is derived from the master key and then the authentication key is derived from the master key or vice versa.

Figure 4:
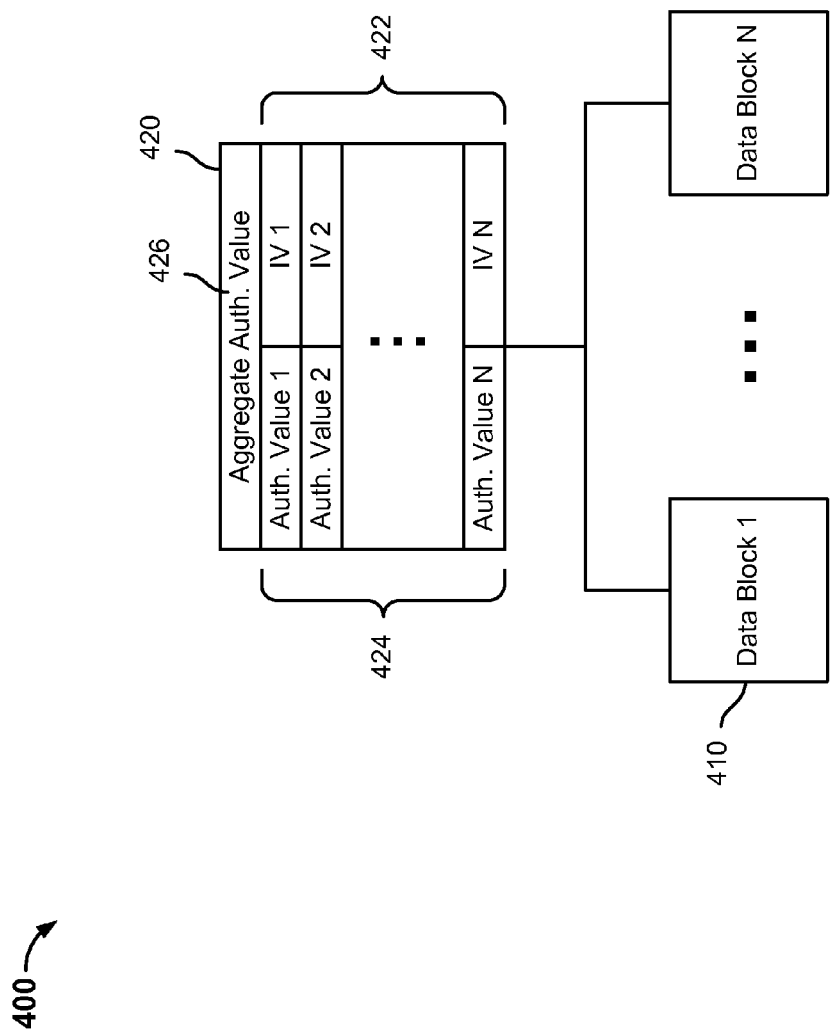
FIG. 4 is a diagram illustrating embodiments of a tree data structure including encrypted data blocks.

FIG. 4 is a diagram illustrating embodiments of a tree data structure including encrypted data blocks. In various embodiments, the tree data structure 400 of FIG. 4 is used to store relatively small files (e.g., files of up to 2 MB and/or any other size files). In certain cases, the size of file stored using a tree data structure 400 may be constrained by the amount of data (e.g., authentication values, initialization vectors, etc.) that can be stored in the header block. In one example, a storage system may be configured such that a header block can store up to 512 and/or another number of entries. In this case, the tree data structure 400 may accommodate up to 512 data blocks of, for example, 4 kilobytes (KB). In this case, the tree data structure 400 stores up to approximately 2 MB of data.

In the example shown, a tree data structure 400 includes encrypted data blocks 410, a header block 420, and/or other elements. The encrypted data blocks 410 may include leaf nodes, and the header block 420 may include a root node of a tree structure 400. In various embodiments, the encrypted data blocks 410 are encrypted using an encryption key (e.g., including a master key and/or a key derived from a master key), an initialization vector, and/or other information. In certain cases, a unique initialization vector is generated for each data block. The initialization vectors for each of the encrypted data blocks are stored in the header block 420. The header block 420 may include a set of initialization vectors 422, and each of the initialization vectors in the set 422 is associated with an encrypted data block 410. In some embodiments, an authentication value is generated for each of the encrypted data blocks 410. An authentication value may include a MAC, an HMAC, a hash, authentication tag (e.g., AES-GCM tag), and/or any other type of information used to verify the authenticity and/or integrity of an encrypted data block 410. In one example, an authentication value includes an HMAC. An HMAC is generated for each encrypted data block 410 using the encrypted data block as input to an HMAC operation. In another example, data blocks are encrypted using AES-GCM, and an authentication tag (an authentication value) is generated for each encrypted data block 410. The header block 420 may include a set of authentication values 424. Each of the authentication values in the set 424 may be associated with an encrypted data block 410.

In various embodiments, an aggregate authentication value 426 is generated and stored in the header block 420. An aggregate authentication value 426 may be generated based on the authentication values 424, initialization vectors 422, and/or other information included in the header block 420. An aggregate authentication value 426 may also be generated based on any other information associated with and/or derived from the encrypted data blocks 410. In one example, the aggregate authentication value 426 includes an HMAC of the authentication values 424 and/or initialization vectors 422 for each of the encrypted data blocks 410. The HMAC may receive as input a message including the set of authentication values 424, the set of initialization vectors 422, and/or other information; an authentication key; and/or other information. The output of HMAC operation includes the aggregate authentication value 426.

In various embodiments, the information included in the header block 420 is stored in the clear (e.g., in plain text). By storing the header block information in plain text, the integrity of file can be verified by reading an aggregate authentication value 426, authentication values 424, and/or other data from the header block 420. In other embodiments, the information included in the header block 420 is encrypted. The header block 420 may be encrypted using the master key and/or a key derived from the master key.

In some embodiments, a tree data structure 400 is updated when a new block is added. When a new block is added, the new block is encrypted using the techniques disclosed herein. An authentication value is generated for the encrypted new block. In certain cases, an authentication value is generated for the new block, and the new block is encrypted in a single operation, such as an AES-GCM encryption operation. The authentication value is added to the set of authentication values 424 included in the header block 420. In some cases, the initialization vector (if any) and/or other information associated with the new block are added to the header block 420. An updated aggregate authentication value 426 is generated based on the updated set of authentication values 424, the updated set of initialization vectors 422, and/or other information. As a result, the updated aggregate authentication value 426 reflects the addition of the new block.

In various embodiments, a tree data structure 400 is updated when an encrypted data block 410 is changed. A change to an encrypted block 410 is detected as a result of, for example, a file edit and/or other operation. In response to the detection of the change, the changed data block is re-encrypted. In one example, a new initialization vector is generated, and the new initialization vector is used to encrypt the changed block. The new initialization vector for the changed block is added to the set of initialization vectors 422 in the header block 420. The new initialization vector may replace an initialization vector that was stored for the changed block prior to the change. In some cases, a new authentication value is generated for the changed encrypted block, and the new authentication value is added to the set of authentication values 424 included in the header block 420. The new authentication value may replace a previously-stored authentication value in the set of authentication values 424. An updated aggregate authentication value 426 is generated based on the updated set of authentication values 424, the updated set of initialization vectors 422, and/or other information. As a result, the updated aggregate authentication value 426 reflects the change to the block and/or the state of the file after the change.

According to some embodiments, the tree data structure 400 is updated when an encrypted data block is removed/deleted. Removal of an encrypted data block is detected, and in response to the detection, the header block 420 is updated. The initialization vector is removed from the set of initialization vectors 422. The authentication value for the removed block may be removed from the set of authentication values 424. In some cases, the authentication value for the removed block is replaced with a value indicating that the block has been removed. For example, the authentication value may be replaced with a value including all zeros and/or another value to indicate that the block has been removed. An updated aggregate authentication value 426 is generated based on the updated set of authentication values 424, the updated set of initialization vectors 422, and/or other information.

According to some embodiments, the aggregate authentication value 426 and/or set of authentication values 424 is used to (quickly) verify the authenticity of each of the data blocks 410 included in a file. The integrity of a file may be verified prior to reading data from the file, changing data in the file, and/or at any other time. In some embodiments, the aggregate authentication value 426 is compared to a reference/expected (e.g., cached aggregate authentication value) authentication value to determine whether any of the encrypted data blocks 410 in the file have been altered (e.g., maliciously altered), reordered, and/or otherwise tampered with. In various embodiments, to verify the integrity of a file (at a time after generation of the aggregate authentication value), authentication values for each of the encrypted data blocks in a file are generated. A reference aggregate authentication value is determined based on the generated authentication values, the set of initialization vectors 422, and/or other information. The reference aggregate authentication value is compared to the aggregate authentication value 426 stored in the header block 420. In the event that the reference aggregate authentication value matches the aggregate authentication value 426 in the header block, it may be determined that the file has not been altered. In the event that the reference aggregate authentication value does not match the aggregate authentication value 426 in the header block, it may be determined that the file has been altered. Upon a determination that the file has been altered, one or more of the authentication values for the encrypted data blocks 410 may be analyzed to determine which data blocks have been altered. Using the techniques disclosed herein, the authenticity of a file may be quickly verified based on the aggregate authentication value 426, and the identity of any (unexpectedly and/or maliciously) changed blocks 410 may be determined with relative ease.

Figure 5:
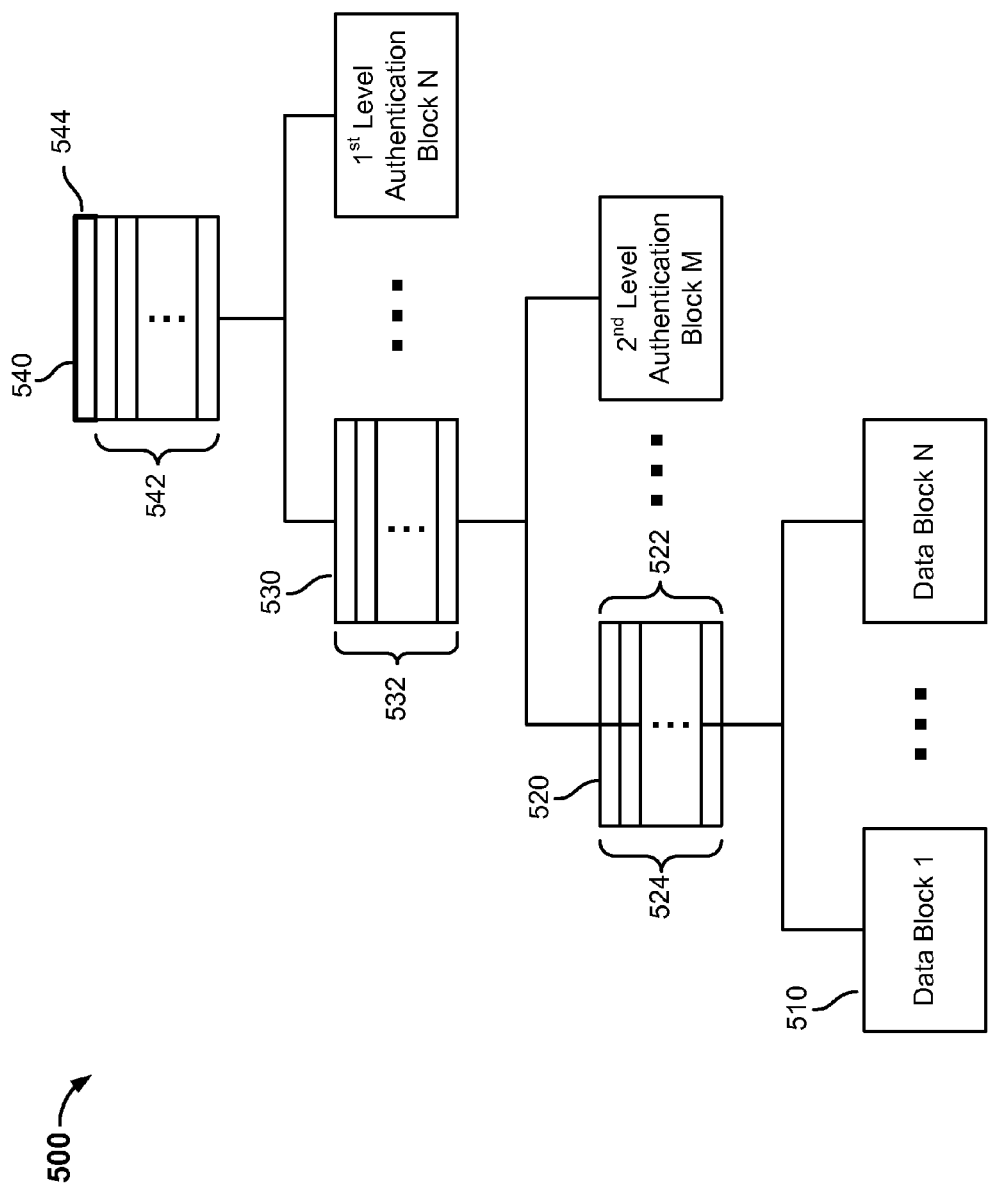
FIG. 5 is a diagram illustrating embodiments of a tree data structure including encrypted data blocks.

FIG. 5 is a diagram illustrating embodiments of a tree data structure including encrypted data blocks. The tree data structure 500 of FIG. 5 includes similar features to the tree data structure 400 of FIG. 4. The techniques used to generate, modify, and/or update tree data structure 400 may be used for similar purposes in conjunction with tree data structure 500.

In the example shown, a tree data structure 500 includes encrypted data blocks 510, a header block 540, first level authentication blocks 530 (e.g., hash blocks), second level authentication blocks 520 (e.g., HMAC blocks), and/or other elements. In some embodiments, the encrypted data blocks 510 include leaf nodes, the first level authentication blocks 530 include internal nodes (e.g., a first level of internal nodes), the second level authentication blocks 520 include internal nodes (e.g., a second level of internal nodes), and/or the header block 540 includes a root node of a tree structure. In various embodiments, the tree data structure 500 of FIG. 5 is used to store larger files, such as files larger than 1 GB. In certain cases, the size of file stored using a tree data structure 500 may be constrained by the amount of data that can be stored in each authentication block 520, 530 and/or header block 540. In one example, a storage system may be configured such that an internal node can store up to 512 and/or another number of entries (e.g., authentication values, initialization vectors, etc.). In this case, each second level authentication block 520 may store authentication values and/or initialization vectors for up to 512 data blocks. Similarly, each first level authentication block 530 may store authentication values for up to 512 second level authentication blocks 520. The header block 540 may also store authentication values for up to 512 first level authentication blocks 530.

In various embodiments, the encrypted data blocks 510 are encrypted using an encryption key, an initialization vector (e.g., a unique initialization vector for each data block), and/or other information. An initialization vector for an encrypted data block 510 is stored in a second level authentication block 520 that points to (e.g., is a parent to) the encrypted data block 510. In certain cases, each second level authentication block 520 stores a set of initialization vectors 522. The set of initialization vectors 522 includes initialization vectors associated with each of the encrypted data blocks 510 below the second level authentication block 520.

In various embodiments, a tree data structure may include additional levels of authentication blocks (e.g., more than two levels of authentication blocks as shown in FIG. 5). In certain cases, regardless of a number of levels in a tree structure, an initialization vector used to encrypt a data block is stored in the authentication block directly above the data block in the tree structure. The authentication blocks that point directly to data blocks may include initialization vectors for each of the data blocks. The authentication blocks that do not directly point to the data blocks may not include initialization vectors.

In some embodiments, an authentication value is generated for each of the encrypted data blocks 510. An authentication value for an encrypted data block 510 is stored in a second level authentication block 520 that is a parent to the encrypted data block 510. Each second level authentication block 520 stores a set of authentication values 524. The set of authentication values 524 includes authentication values associated with each of the encrypted data blocks 510 below the second level authentication block 520.

In various embodiments, an authentication value for each of the second level authentication blocks 520 is generated. An authentication value for a second level authentication block 520 is generated based on information stored in the second level authentication block 520. For example, an authentication value for a second level authentication block may be generated based on a set of initialization vectors 522, a set of authentication values 524, and/or other information stored in a second level authentication block 520. In some embodiments, an authentication value for a second level authentication block 520 is stored in a first level authentication block 530 that is a parent of the second level authentication block. Each first level authentication block 530 stores a set of authentication values 532. The set of authentication values 532 includes authentication values associated with each of the second level authentication blocks 520 below (e.g., that are children to) the first level authentication block 530.

In various embodiments, an authentication value for each of the first level authentication blocks is generated. An authentication value for a first level authentication block 530 is generated based on information stored in the first level authentication block 530. An authentication value for a first level authentication block 530 may be generated based on a set of authentication values 532 and/or other information stored in a first level authentication block 530. An authentication value for a first level authentication block 530 is stored in the header block 540, which is a parent of the first level authentication block 530. The header block 540 stores a set of authentication values 542. The set of authentication values 542 includes authentication values associated with each of the first level authentication blocks 530 below the header block 540.

In various embodiments, an aggregate authentication value 544 is generated and stored in the header block 540. An aggregate authentication value 544 (shown in bold outline in FIG. 5) may be generated based on the authentication values 542 and/or other information included in the header block 540. The aggregate authentication value 544 may be derived (directly and/or indirectly) from authentication values, initialization vectors, and/or other information associated with each encrypted data block 510, each internal node block (e.g., first level authentication blocks 530 and second level authentication blocks 520), and/or other elements in the tree data structure 500. The aggregate authentication value 544 therefore may be used to verify the authenticity of each node in the tree data structure 500 and/or the tree data structure 500 as a whole.

According to various embodiments, a tree data structure 500 is updated when a new block is added. When a new block is added, the new block is encrypted using the techniques disclosed herein. An authentication value is generated for the encrypted new block. The authentication value is added to the set of authentication values 524 included in a second level authentication block 520 that is a parent to the encrypted data block 510. In some cases, the initialization vector (if any) and/or other information associated with the new block are added to the set of initialization vectors 522 included in the second level authentication block 520. An updated authentication value is generated for the second level authentication block 520. The updated authentication value may be generated based on an updated set of initialization vectors 522 including the initialization vector associated with the new block, an updated set of authentication values 524 including the authentication value for the new encrypted data block, and/or other information. The updated authentication value for the second level authentication block 520 is added to the set of authentication values 532 included in the first level authentication block 530 that is a parent to the second level authentication block 520. An updated authentication value for the first level authentication block 530 is generated. The updated authentication value for the first level authentication block 530 may be generated based on an updated set of authentication values 532 including the updated authentication value for the second level authentication block 520. The update authentication value for the first level authentication block 530 is added to the header block 540. The set of authentication values 542 stored in the header block 540 is updated to include the updated authentication value for the first level authentication block 530 below the header block 540. The aggregate authentication value 544 associated with the header block 540 is updated based on the set of authentication values 542 including the updated authentication value for the first level authentication block 530.

In various embodiments, a tree data structure 500 is updated when an encrypted data block 510 is changed. A change to an encrypted block 510 is detected. In response to the detection of the change, the changed data block is re-encrypted. In some embodiments, a new initialization vector may be generated, and the new initialization vector is used to encrypt the changed block. The new initialization vector for the change block is added to the second level authentication block 520 above the changed block. The new initialization vector may replace a previously-stored initialization vector in the set of initialization vectors 522. In some cases, a new authentication value is generated for the changed encrypted block, and the new authentication value is added to the set of authentication values 524 included in second level authentication block 520. The new authentication value may replace a previously-stored authentication value for the block in the set of authentication values 524. An updated authentication value for the second level authentication node 520 is generated based on the updated set of authentication values 524, the updated set of initialization vectors 522, and/or other information. The updated authentication value for the second level authentication block 520 is added to the set of authentication values 532 included in the first level authentication block 530. An updated authentication value for the first level authentication block 530 is generated and added to the header block 540. An updated aggregate authentication value 544 is generated based on the updated set of authentication values 542 in the header block 540.

According to some embodiments, the tree data structure 500 is updated when an encrypted data block is removed and/or deleted. Removal of an encrypted data block is detected, and in response to the detection, the second level authentication block 520 above the deleted block is updated. The second level authentication block 520 may be updated by removing the initialization vector for the removed block from the set of initialization vectors 522. The authentication value for the deleted block is removed from the set of authentication values 524. In some embodiments, the authentication value for the removed block in the set 524 is replaced with a marker indicating that the block has been removed. For example, the authentication value may be replaced with a marker including all zeros and/or another value to indicate that the block has been removed. The marker may indicate that the blocks below are empty and therefore do not need to be accessed in a read operation, encrypted, and/or otherwise processed. An updated authentication value for the second level authentication block 520 is generated based on the updated set of authentication values 524, the updated set of initialization vectors 522, and/or other information. The updated authentication value for the second level authentication block 520 is added to the set of authentication values 532 included in the first level authentication block 530 above the second level authentication block 520. An updated authentication value is generated for the first level authentication block 530. The updated authentication value for the first level authentication block 530 is added to the set of authentication values 542 in the header block. An updated aggregate authentication value 544 is generated based on the updated set of authentication values 542 in the header block 540.

Using the techniques disclosed herein, adding a new data block to the tree 500, changing a block in the tree 500, removing a block from the tree 500, and/or other similar operations may require only updating the nodes above the block, rather than the whole tree 500. In the example shown, adding, changing, and/or removing a block may only require updates to the second level authentication block above the new block, the first level authentication block above the second level authentication block, and the header block. Compared to updating the entire tree (as possibly required by certain prior art approaches), updating several blocks may require minimal processing overhead.

According to some embodiments, the aggregate authentication value 526, a set of first level authentication values 532, a set of second level authentication values 524, and/or other information may be used to verify the authenticity and/or integrity of a data block 510 included in a file. The integrity of a data block and/or file may be verified prior to reading data from the file, editing data in a file, and/or performing other operations. In some embodiments, to verify the authenticity and/or integrity of a data block (at a time after generation of the aggregate authentication value 544), a reference authentication value for the data block is generated. The reference authentication value for the data block is compared to a corresponding authentication value in the set of second level authentication values 524 stored in the second level authentication block 520 above the data block 510. In the event the reference authentication value matches the corresponding authentication value in the set of authentication values 524, the set of first level authentication values 532 in the first level authentication block 530 directly above is analyzed using a similar approach. This process is repeated for each level of the tree data structure 500 up to the header block 540. In the event that a reference authentication value does not match an authentication value stored in a node of the tree data structure, it may be determined that the file has been altered. Upon a determination that the file has been altered, one or more of the authentication values for the encrypted data blocks 510 may be analyzed to determine which data blocks have been altered.

In various embodiments, the tree data structure 500 of FIG. 5 includes four levels—a header block 540, first level authentication blocks 530, second level authentication blocks 520, and encrypted data blocks 510. The techniques discussed with regard to FIG. 5 are not limited to use with a tree including four levels and may be extended for use in trees including any number of levels (e.g., a tree including N levels of the authentication blocks).

Figure 6:
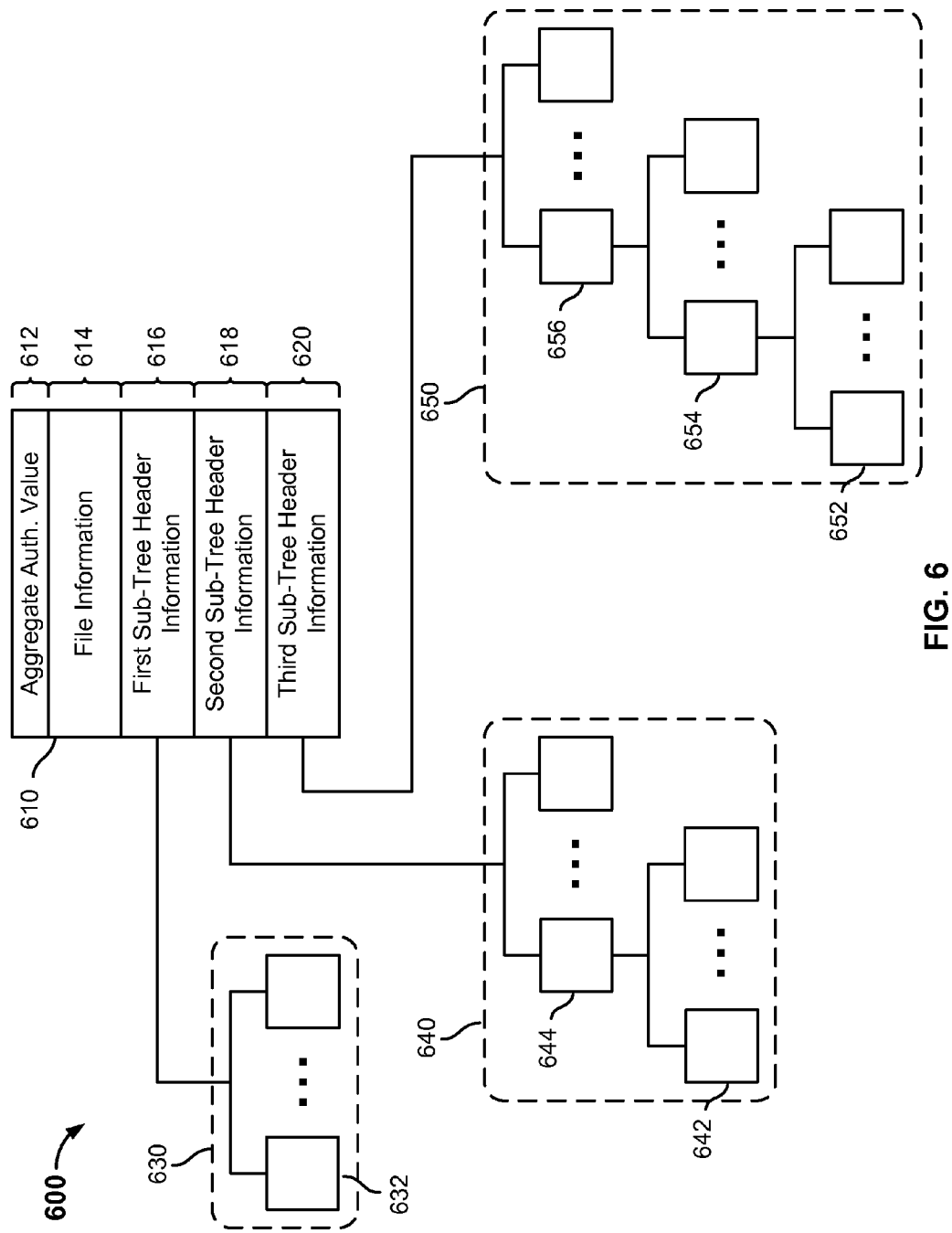
FIG. 6 is a diagram illustrating embodiments of a tree data structure including encrypted data blocks.

FIG. 6 is a diagram illustrating embodiments of a tree data structure including encrypted data blocks. The tree data structure 600 includes an imbalanced tree structure, such as a lop-sided asymmetric tree. The tree data structure 600 of FIG. 6 includes similar features to the tree data structure 500 of FIG. 5 and the tree data structure 400 of FIG. 4. The techniques used to generate, modify, and/or update tree data structure 400 and tree data structure 500 may be used for similar purposes in conjunction with tree data structure 600.

In the example shown, a tree data structure 600 includes a header block 610, a first sub-tree 630, a second sub-tree 640, a third sub-tree 650, and/or other elements. The header block 610 includes an aggregate authentication value 612, file information 614, first sub-tree header information 616, second sub-tree header information 618, third sub-tree header information 620, and/or other information. The aggregate authentication value 612 includes an authentication value generated based on the information included in the header block. The aggregate authentication value 612 may include, for example, a MAC, HMAC, hash, and/or other authentication value generated based on the file information 614, first sub-tree header information 616, second sub-tree header information 618, third sub-tree header information 620, and/or other information stored in the header block 610. The aggregate authentication value 612 may be generated using the techniques discussed above with reference to FIGS. 4 and 5.

In various embodiments, the file information 614 may include the name of the file, encryption version information, a file path authentication value, file revision information, an encrypted payload including the length and/or size of the file, and/or other information. In some embodiments, the encryption version information may include a type and/or version of encryption used to secure the file, such AES 128, AES 256, AES-CBC, AES-GCM, and/or any other encryption approach. The encryption version information may be used to decrypt and/or encrypt various data blocks in the tree 600. In various embodiments, the file path authentication value may include an authentication value generated based on the file path for the file stored in the tree data structure 600. The file path authentication value may include a MAC, HMAC, hash, and/or other authentication value generated based on the file path for the file. In one example, the authentication value includes an HMAC generated using a key derived from the master key, the file path ("database/ XYZapp/file123.db"), and/or other information. The file path authentication value in the header 610 may be used to detect whether the file has been moved, swapped with another file, and/or otherwise tampered with. In some embodiments, the file revision information may include a file version count associated with the file. The file version count may increase monotonically with each modification to a file in the header. The file revision information may be validated against a revision list stored separately from the file (e.g., cached separately). Validating the file revision information may be used to, for example, detect whether an adversary has replaced a file and/or portions of the file with an older version of the file. In various embodiments, the encrypted payload including the length and/or size of the file may be encrypted using a key derived from the master key. Storing an encrypted payload including the size of the file may allow a user to detect whether data has been (unexpectedly and/or maliciously) removed from and/or added to the file.

In various embodiments, a first sub-tree 630 includes encrypted data blocks 632. In this example, the first sub-tree 630 includes one level—leaf nodes including the encrypted data blocks 630. The first sub-tree header information 616 may include a header block of the first sub-tree 630. In various embodiments, initialization vectors (if used) and/or other information used to encrypt the encrypted data blocks 632 are stored in the first sub-tree header information 616 portion of the header block 610. Authentication values generated for each of the encrypted data blocks 632 are stored in the first sub-tree information 616 portion of the header block 610.

In some embodiments, a second sub-tree 640 includes encrypted data blocks 642 and one level of authentication blocks 644 (e.g., internal nodes). The second sub-tree 640 includes a depth of two-levels—internal nodes including the authentication blocks 644 and leaf nodes including encrypted data blocks 642. In various embodiments, each authentication block 644 points to a set of encrypted data blocks 642. In one example, the second sub-tree 640 includes 100 authentication blocks 644 that each point to 512 encrypted data blocks 642. Each of one or more of the authentication blocks 644 includes a set of authentication values, a set of initialization vectors, and/or other information for each of the encrypted data blocks 642 that are children of the authentication block. An authentication value is generated for each authentication block 644 based on the set of authentication values, set of initialization vectors, and/or other information stored in the authentication block. The authentication values for each of the authentication blocks 644 are stored in the second sub-tree header information 618 portion of the header block 610.

In some embodiments, a third sub-tree 650 includes encrypted data blocks 652, first level authentication blocks 656, second level authentication blocks 654, and/or other elements. The third sub-tree 650 includes a depth of three-levels—the first level authentication blocks 656, second level authentication blocks 654, and leaf nodes including encrypted data blocks 652.

In various embodiments, each first level authentication block 656 points to a set of second layer authentication blocks 654, which each point to a set of encrypted data blocks 652. In one example, the third sub-tree 650 includes 100 first level authentication blocks 656 that each point to 512 second level authentication blocks 654, which each point to 512 encrypted data blocks 642. Each of one or more of the second level authentication blocks 654 includes a set of authentication values, a set of initialization vectors, and/or other information for each of the encrypted data blocks 652 that are children of the second level authentication block. An authentication value is generated for each second level authentication block 654 based on the set of authentication values, set of initialization vectors, and/or other information stored in the authentication block. The authentication values for each of the second level authentication blocks 654 are stored in a first level authentication block 656 above the second level authentication block 654. An authentication value is generated for each of the first level authentication blocks 656 based on the authentication values stored in the first level authentication block 656. The authentication values for each of the first level authentication blocks 656 are stored in the third sub-tree header information 620 portion of the header block 610.

In various embodiments, the depth of the tree data structure 600 is dependent on the size of the file. For example, small files may include only a first sub-tree 630; medium-sized files may include a first sub-tree 630 and a second sub-tree 640; large files may include a first sub-tree 630, a second sub-tree 640, a third sub-tree 650, and/or other sub-trees (not shown). In certain cases, the depth of the tree structure 600 is expanded as data is added to a file. In one example, a data file may initially include a small amount of data (e.g., less than 400 KB as discussed below) and may be initially stored in a tree data structure 600 that includes a first sub-tree 630. The first sub-tree structure 630 includes a depth of one level, and the overhead associated with processing data (such as the time and/or number of operations to read, edit, remove, add, encrypt, decrypt, and/or otherwise process a file) in a tree including a depth of one level is relatively low. As data is added to the file, additional sub-trees may be added to the tree data structure 600, and the new data may be stored in the added sub-trees. The additional sub-trees (such as the second sub-tree 640, third sub-tree 650, etc.) include additional levels of depth. The processing overhead increases as the depth of the tree increase, but additional tree depth may be necessary to accommodate the additional data. As a result, using the techniques disclosed herein, processing overhead is optimized based on the size of the file.

By way of example, each of the first sub-tree header information 616, second sub-tree header information 618, third sub-tree header information 620, and/or other portions of the header block 610 include a set capacity. The capacity of each sub-tree header information field and/or sub-tree may be defined by configurations/settings for the file, device, etc.; set by an administrator; and/or determined based on the constraints on the size of the header block 610. In one example, the first sub-tree header information 616 includes a capacity of 100 entries. In this case, the first 100 data blocks of a file are stored in the first sub-tree 630. In one example in which 4 KB data blocks are used, the first 400 KB of a file is stored in the first sub-tree 630. In the case in which the first sub-tree 630 is not fully populated (e.g., the file is less than 400 KB or another file size), the tree data structure 600 may include just the first sub-tree 630. If additional data is added to a file to increase its size to greater than the capacity of the first sub-tree 630, the additional data is stored in the second sub-tree 640. In certain cases, the capacity of the second sub-tree header information 618 includes 100 entries. In this case, the second sub-tree may include 100 authentication blocks 644 and each authentication block may be a parent to 512 and/or another number of encryption data blocks 642. In one example in which 4 KB data blocks are used, a second portion of the file up to approximately 50 MB (e.g., from 400 KB to 50 MB) is stored in the second sub-tree 640. When additional data is added to a file and its size exceeds the capacit(ies) of the first sub-tree 630 and/or second sub-tree 640, the additional data is stored in the third sub-tree 650. The process may be continued until, for example, the header block 610 has reached full capacity. At that point an additional tree may be generated, and the file may be stored across multiple tree data structures 600.

According to various embodiments, the process of adding new data blocks to, changing data blocks within, and/or removing data blocks from the tree data structure 600 is similar to the process described with reference to FIGS. 4 and 5. In various embodiments, the process of verifying the integrity and/or authenticity of the data blocks in the tree data structure 600 is similar to the processes described above with reference to FIGS. 4 and 5.

Figure 7:
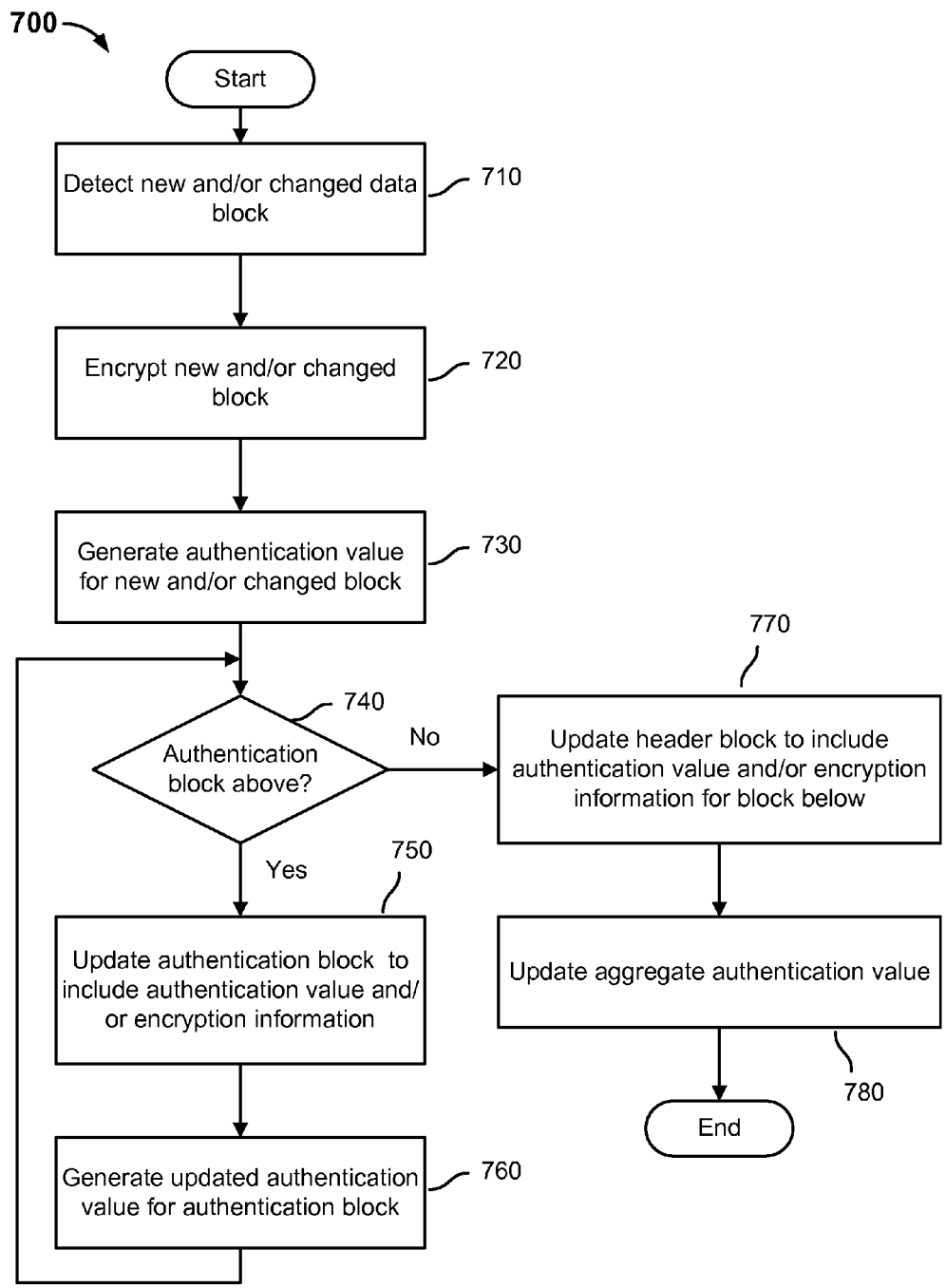
FIG. 7 is a flow chart illustrating embodiments of a process to update a tree data structure.

FIG. 7 is a flow chart illustrating embodiments of a process to update a tree data structure. At 710, the addition of a new data block and/or change to a data block is detected. An addition of a new data block may be detected when data is added to a file. A change to a data block may be detected based on a read, write, edit, and/or other operation associated with data in the file.

At 720, the new and/or changed data block is encrypted. The new data block and/or changed data block may be encrypted using any of the techniques disclosed herein (e.g., AES-CBC, AES-GCM, etc.). In certain cases depending on the type of encryption used, an initialization vector may be generated. The new data block and/or changed data block is encrypted using an encryption key, an initialization vector, and/or other encryption information.

At 730, an authentication value is generated for the new and/or changed data block. The authentication value may include a MAC, HMAC, AES-GCM authentication tag, and/or other authentication value.

At 740, it is determined whether the tree data structure includes an authentication block above the encrypted data block and/or authentication block (as discussed below). In certain cases, a tree data structure and/or a portion of a tree data structure to which the new block is added and/or changed block is located includes one or more levels of authentication blocks (e.g., internal nodes). In the event the new data block is added to and/or the changed block is stored in a portion of the tree data structure including internal nodes (one or more levels of authentication blocks), the process proceeds to step 750. In the event the data block is added to and/or the changed block is stored in a portion of the tree data structure that does not include internal nodes (authentication blocks), the process proceeds to step 770.

At 750, an authentication block is updated to include an authentication value and/or encryption information for the new and/or changed data block. In various embodiments, an authentication block that points to the new and/or changed data block is updated to include the authentication value for the encrypted data block, encryption information (such as the initialization vector used to encrypt the data block), and/or other information.

At 760, an updated authentication value is generated for an authentication block. In one example, the authentication block may point directly to the new and/or changed encrypted data block. The set of authentication values in the authentication block is updated to include an authentication value for the new and/or changed block. The set of initialization vectors in the authentication block may also be updated to include the initialization vector for the new and/or changed block. In another example corresponding to a subsequent iteration through the steps 740, 750 and 760 of the process 700, the authentication block (e.g., a first level authentication block) may point to another authentication block (e.g., a second level authentication block) below. In this case, the set of authentication values in the first level authentication block is updated to include the updated authentication value for the second level authentication block below.

Upon generation of the updated authentication value for the authentication block the process proceeds to the step 740. In one example, a new data block is added to and/or a block is changed in a portion of a tree data structure including one level of authentication blocks (e.g., sub-tree 640 of FIG. 6). In this case, it may be determined at step 740 that the no authentication blocks are above the updated authentication block in the tree data structure. The process may proceed to step 770, and the update authentication value is added to the header block (as discussed below). In another example, the new data block is added to a portion of a tree data structure including multiple levels of authentication blocks (e.g., sub-tree 650 of FIG. 6). In this case, the process may iterate through steps 740, 750, 760 until updated authentication values have been generated for each level of authentication blocks in tree data structure. Once an authentication value has been generated for the first level authentication block below the header block, the process proceeds to step 770.

At 770, a header block is updated to include an authentication value and/or encryption information for a block below the header block. In some embodiments in which the new and/or changed data block is directly below the header block, a set of initialization vectors stored in the header block is updated to include an initialization vector for an encrypted data block below the header block (that is a child to the header block). In this case, the header block may also be updated to include an authentication value for the encrypted data block below the header block. In various embodiments in which the new and/or changed data block is located in portion of the tree data structure including one or more levels authentication blocks (internal nodes), a set of authentication values stored in a header block is updated to include the updated authentication value for an authentication block below the header block.

At 780, an aggregate authentication value is updated. In various embodiments, the aggregate authentication value associated with the header block is updated based on the set of authentication values and/or initialization vectors.

Figure 8A:
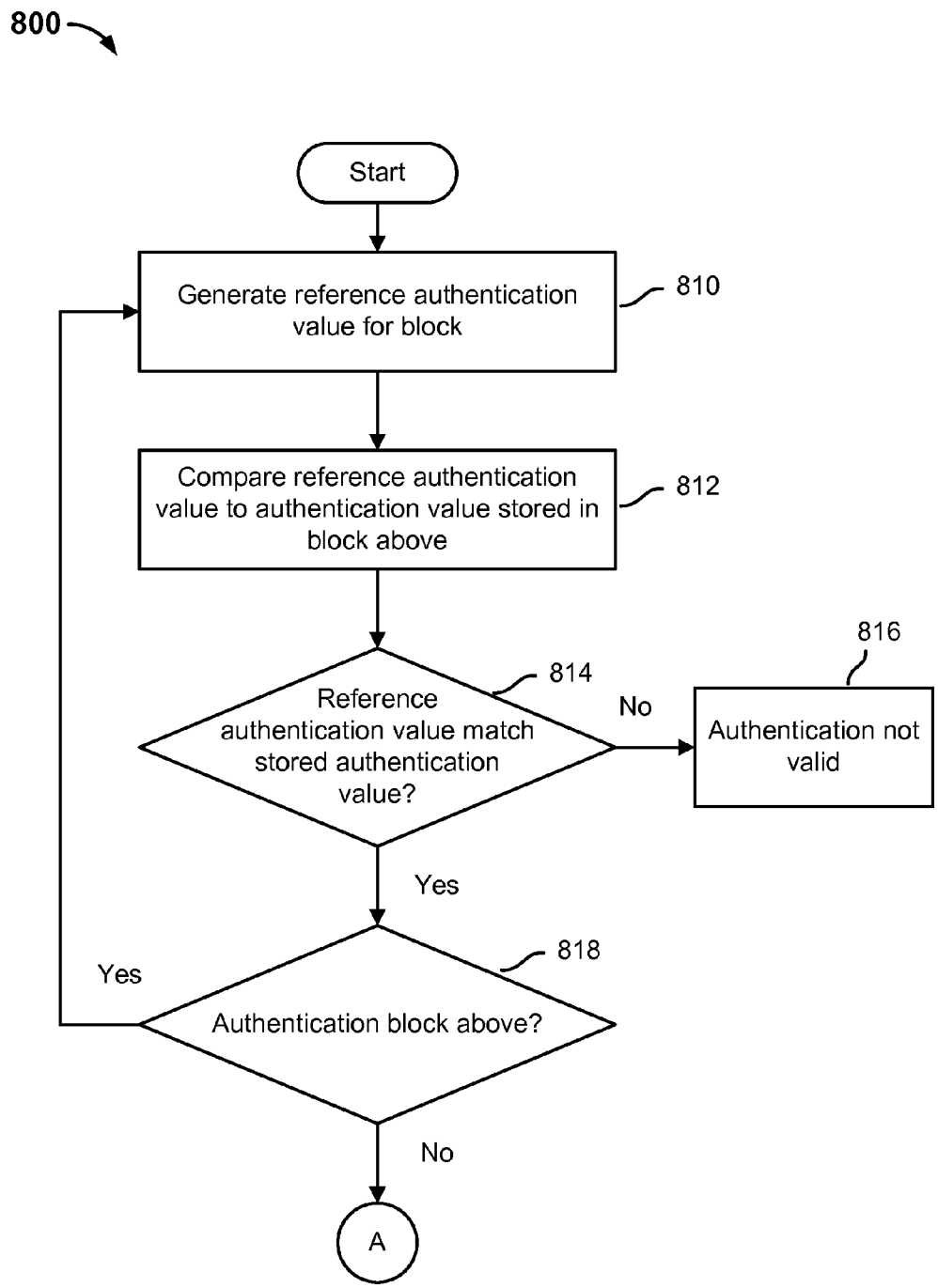
FIG. 8A is a flow chart illustrating embodiments of a process to read data from a tree data structure.

FIG. 8A is a flow chart illustrating embodiments of a process to read data from a tree data structure. In some embodiments, FIG. 8A include a first set of steps of a process 800 to read data from a tree structure and FIG. 8B include a second set of steps in the process 800. According to various embodiments, the authenticity of a data block and/or file may be verified prior to reading data from the data block and/or file, editing the data block and/or file, and/or performing other operations.

At 810, a reference authentication value is generated for a block. In various embodiments, a reference authentication value is generated for a data block (e.g., at read time, edit time, etc.) to verify the authenticity and/or integrity of a data block. A reference authentication value may be generated using any of the techniques disclosed herein and/or known in the art. In one example, the reference authentication value includes an HMAC of the encrypted data block. The reference HMAC is generated at read time.

In some embodiments, a reference authentication value is generated for an authentication block during subsequent iterations of the process 800 (e.g., after completion of at least one iteration through step 818 as discussed below).

At 812, the reference authentication value is compared to a corresponding authentication value stored in the authentication block above the block. In various embodiments, the reference authentication value is compared to a corresponding authentication value (e.g., an authentication value for that block) in set of authentication values stored in the authentication block above the block.

In some embodiments, a tree data structure may include two levels—a header block and encrypted data blocks below the header block. In this case, the reference authentication value is compared to an authentication value stored in the header block above the encrypted data block.

At 814, it is determined whether the reference authentication value matches the authentication value stored in the block above. In the event the reference authentication value matches the authentication value stored in the block above, the process proceeds to step 818. In the event the reference authentication value does not match the authentication value stored in the block above, the process proceeds to step 816.

At 816, it is determined that the authenticity and/or integrity of the data block and/or tree structure is not valid. If a reference authentication value for a data block (which is generated at read time) does not match an authentication value stored in an authentication block above, it may indicate that the data block has been changed (e.g., unexpectedly, maliciously, etc.) between read time and the time when the authentication value was originally generated and stored in the authentication block and/or header block above. In this case, the integrity of the data block may not be validated. Similarly, if a reference authentication value for an authentication block does not match a corresponding authentication value stored in an authentication block above, it may indicate that the authentication block and/or a data block below the authentication block in the tree structure has been changed.

At 818, it is determined whether any authentication blocks are located above the block in the tree structure. In the event that a block directly above is an authentication block (as opposed to a header block), the process proceeds to step 810. In this case, steps 810 thru 818 are repeated for each authentication block above the data block in the tree structure. For example, to verify the integrity of a data block, authentication values in each of the authentication blocks above the data block are verified up the tree, and the authentication values in the header block are verified as discussed below. In the event that a block directly above includes the header block, the process proceeds to step 820 of FIG. 8B.

Figure 8B:
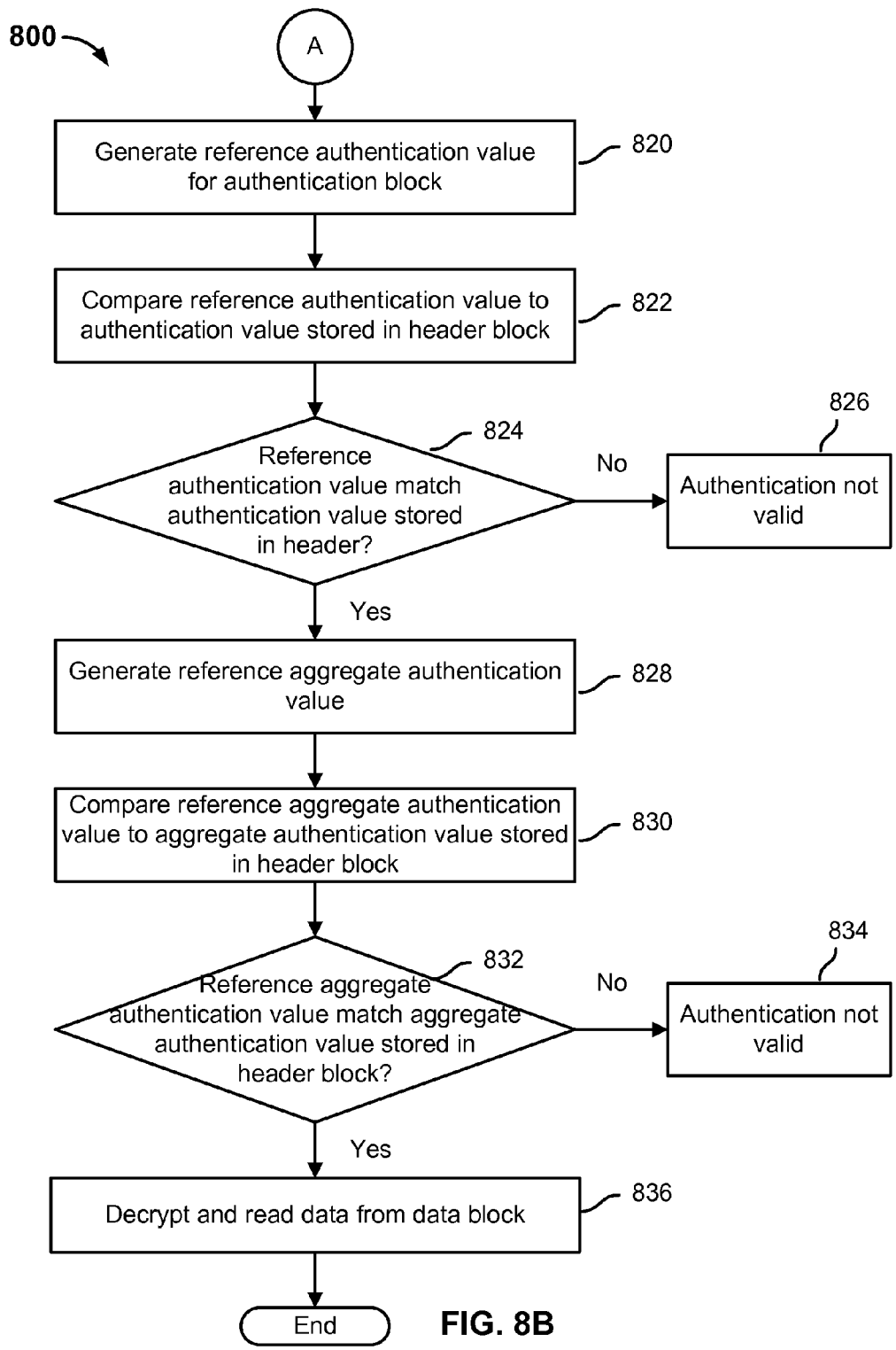
FIG. 8B is a flow chart illustrating embodiments of a process to read data from a tree data structure.

FIG. 8B is a flow chart illustrating embodiments of a process to read data from a tree data structure. At 820, a reference authentication value is generated for an authentication block. A reference authentication value may be generated using any of the techniques disclosed herein and/or known in the art. The reference authentication value may include an authentication value (e.g., hash, HMAC, etc.) generated based on contents of the authentication block.

At 822, the reference authentication value is compared to a corresponding authentication value stored in the header block. In various embodiments, the reference authentication value for the authentication block is compared to a corresponding authentication value in set of authentication values stored in the header block above the authentication block.

At 824, it is determined whether the reference authentication value matches the authentication value stored in the header block. In the event the reference authentication value matches the authentication value stored in the header block, the process proceeds to step 828. In the event the reference authentication value does not match the authentication value stored in the header block, the process proceeds to step 826.

At 826, it is determined that the authenticity of the authentication block and/or data block(s) below the authentication block is not valid. For example, it may be determined that a data block (e.g., the data block referenced in step 810 and/or another data block below the authentication block in the tree structure) below the authentication block has been altered.

At 828, a reference aggregate authentication value is generated for the header block. In some embodiments, a reference aggregate authentication value is generated based on the contents of the header block including file information (e.g., file information 614 of FIG. 6), one or more sets of authentication values stored in the header block (e.g., first sub-tree information 616, second sub-tree information 618, third sub-tree information 620 of FIG. 6; a set of authentication values 542 of FIG. 5; a set of authentication values 424 and initialization vectors 422 of FIG. 4), and/or other information stored in the header block. In certain cases, the reference aggregate authentication value is not generated based on the aggregate authentication value stored in the header block.

At 830, the reference aggregate authentication value is compared to the aggregate authentication value stored in the header block.

At 832, it is determined whether the reference aggregate authentication value matches the aggregate authentication value stored in the header block. In the event the reference aggregate authentication value matches the aggregate authentication value stored in the header block, the process proceeds to step 836. In the event the reference aggregate authentication value does not match the aggregate authentication value stored in the header block, the process proceeds to step 834.

At 834, it is determined that the authenticity and/or integrity of the tree structure is not valid. If a reference aggregate authentication value for the header block (which is generated at read time) does not match an aggregate authentication value stored in the header block, it may indicate that the contents of the header block and/or a block below the header block in the tree structure has been altered (e.g., unexpectedly, maliciously, etc.) between read time and the time when the aggregate authentication value was originally generated and stored in the header block.

At 836, data is decrypted and read from the data block. In various embodiments, an encrypted data block may be decrypted using an encryption key (e.g., a master key and/or encryption key derived therefrom), an initialization vector, and/or other information. The initialization vector may be stored in an authentication block and/or header block directly above the encrypted data block. The initialization vector may have been stored in the authentication block and/or header block directly above the encrypted data block when the encrypted data block was generated and/or last edited. At read time, the initialization vector may be retrieved from the authentication block and/or header block above the encrypted data block and used to decrypt the data block.

In various embodiments, process 800 is used to verify the authenticity of the data block and/or the entire tree structure above the data block. By validating the authentication value of the encrypted data block, the authentication values of each authentication block(s) above the encrypted data block (if any), and/or the aggregate authentication value of the header block, the integrity of the data block and/or tree structure above is validated. Using the techniques disclosed herein, the authenticity of a data block can be verified in several comparison operations without having to authenticate each block in the tree structure each time a portion of the file (e.g., one block) is accessed.

In some embodiments, file information and/or file metadata including the name of the file, encryption version information, a file path authentication value, file revision information, an encrypted payload including the length and/or size of the file, and/or other information are verified at read time. For example, file information and/or metadata may be stored in the header block, and at read time the header block is accessed to verify the file information. In certain cases, the verification of file information is performed in addition to verification steps outlined in process 800.

Figure 9:
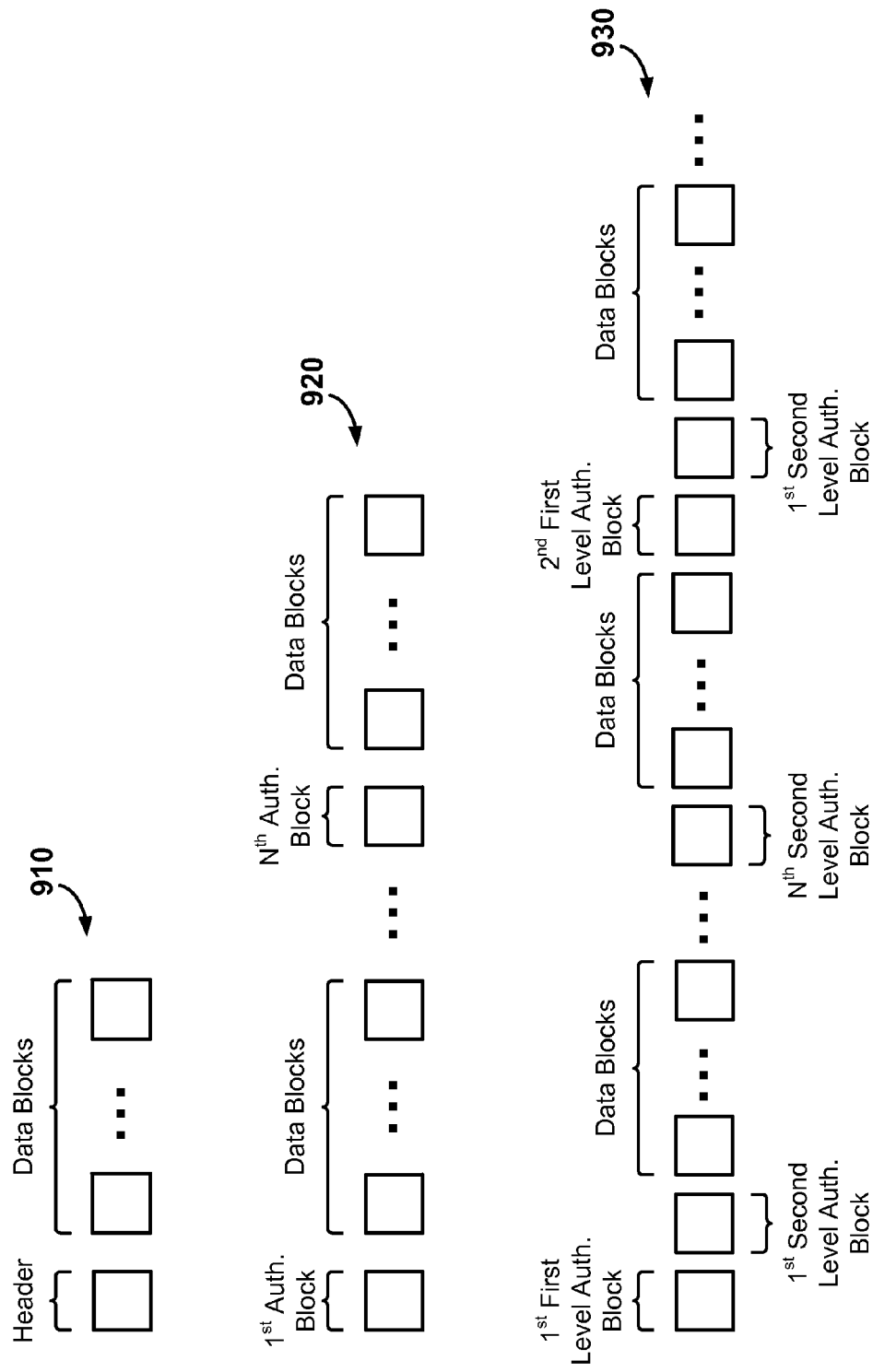
FIG. 9 is a diagram illustrating embodiments of storing an encrypted file in memory.

FIG. 9 is a diagram illustrating embodiments of storing an encrypted file in in memory. In various embodiments, a tree data structure is flattened to generate a series of blocks including the cipher text for a file, and the series of blocks is stored on the mobile device. For example, the series of blocks may be stored in memory associated with an application. In some embodiments, the tree data structure is flattened using a depth-first pre-order traversal approach to generate a series of blocks. In a depth-first pre-order traversal flattening approach, a tree data structure is flattened by repeatedly performing the steps of visiting the root, traversing a left sub-tree, and traversing a right sub-tree. As each node in the tree is visited, the node is added to the series of blocks stored in memory. This process of depth-first pre-order traversal is repeated until the entire tree has been added to the series of blocks.

In the example shown, the series of blocks 910, 920, 930 illustrate a manner in which data from tree data structure 600 of FIG. 6 is stored. A first series of blocks 910 may correspond to a first sub-tree (e.g., first sub-tree 630 of FIG. 6) including one level of encrypted data blocks. The first series of blocks 910 includes the header block (e.g., header block 610 of FIG. 6) followed by a set of data blocks (e.g., encrypted data blocks 632 of FIG. 6) directly below the header block. The first series of blocks 910 may be followed by a second series of blocks 920. The second series of blocks 920 may correspond to a second sub-tree (e.g., second sub-tree 640 of FIG. 6) including one level of authentication blocks (internal nodes), which each point to encrypted data blocks. As stored in memory, the second series of blocks 920 may include a first authentication block followed by the data blocks below the first authentication block, a second authentication block followed by the data blocks below the second authentication block, and so on up to an Nth authentication block followed by the data blocks below the Nth authentication block. The second series of blocks 920 may be followed by a third series of blocks 930. The third series of blocks 930 may correspond to a third sub-tree (e.g., third sub-tree 650 of FIG. 6) including first level of authentication blocks ($1^{st}$ level of internal nodes) that each point to one of a second level of authentication blocks ($2^{nd}$ level of internal nodes) that each point to a set of data blocks. As stored in memory, the third series of blocks 930 may include a first first-level authentication block, followed by a first second-level authentication block, followed by the data blocks below the first second-level authentication block. The data blocks below the first second-level authentication block are followed by a second second-level authentication block, which is followed by the data blocks to which the second second-level authentication block points. This pattern is repeated up to an Nth second-level authentication block followed by the data blocks to which the Nth second-level authentication block points. The data blocks to which the Nth second level authentication block points are followed by a second first-level authentication block, which is followed by a first second-level authentication block and its progeny data blocks. This pattern is repeated to flatten the remaining blocks of the third sub-tree into the third series of data blocks 930.

Flattening the tree structure using the techniques disclosed may be advantageous because it allows for new data to be added to a file with minimal processing. For example, new data may be added to a file by appending the cipher text to include the new data and updating the authentication blocks and/or header block above the added data block. Using the techniques disclosed herein, data blocks do not need to be reordered when new data is added. As a result, the file may include minimal gaps (e.g., empty blocks). Flattening the tree structure using the techniques disclosed herein is also advantageous in that data is stored in an order that corresponds to the order in which the data would be accessed and/or retrieved by, for example, an application, the device, and/or other components. In one example, to access a particular data block, a system may read the header block to determine a location of the data block in the tree structure and/or other information about the file. The system may then access an authentication block that is parent, grandparent, and/or other ancestor of the data block. The system may then walk down the tree to the data block. The system may reach the desired data block with minimal operations.

In various embodiments, the techniques disclosed herein may be used to generate a secure file including all files on a device, all files associated with an application, and/or any other set of files. The file including multiple sub-files may be processed for inclusion in a tree data structure and the tree structure may be flattened for storage on the device using the techniques disclosed herein. In one example, a file including all files on a device (e.g., an entire device file directory) is encrypted using the techniques disclosed herein. As a result of the encryption operation, the number of files on a device, the file names, file modification dates, file permission and/or any other information associated with the files on the device are secured.

In some embodiments, the techniques disclosed herein may be used to provide whole-system integrity (as opposed to per-file integrity) by adding a special file in each directory, which is integrity protected and references the special file in its parent directory (forming a tree). In certain cases, one or more normal files (e.g., all files) in that directory may reference the local special file. Using this approach, an adversary may not be able to selectively replace some files with an older version, but not others. If the special file also contains file names and/or a file count, an adversary cannot selectively remote files from a directory.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
dividing a file into a plurality of data blocks;
encrypting the data blocks;
generating an authentication value for each encrypted data block;
storing the encrypted data blocks in a tree data structure comprising:
the encrypted data blocks; and
a header block, the header block comprising a set of authentication values, each authentication value in the set of authentication values is derived from one or more of the encrypted data blocks, and an aggregate authentication value generated based at least in part on the set of authentication values;
detecting a change to a data block;
encrypting the changed data block;
generating an authentication value for the changed block; and
updating the set of authentication values to include the authentication value for the changed block, wherein:
the tree further comprises a plurality of sub-trees below the header block, wherein each sub-tree includes one or more encrypted data blocks;
the plurality of sub-trees includes a first sub-tree, a second sub-tree, and a third sub-tree;
the first sub-tree comprises one or more encrypted data blocks that are children of the header block;
the second sub-tree comprises one level of one or more authentication blocks and a level of one or more encrypted data blocks below the one level of authentication blocks;
the third sub-tree comprises a first level of one or more authentication blocks below the header block, a second level of one or more authentication blocks below the first level, and one or more encrypted data blocks below the second level of authentication blocks; and
the set of authentication values in the header block comprises: a first set of one or more authentication values for the encrypted data blocks in the first sub-tree, a second set of one or more authentication values for the authentication blocks included in the second sub-tree; and a third set of one or more authentication values for the first level of authentication blocks included in the third sub-tree.

2. The method of claim 1, wherein the encrypted data blocks comprise leaf nodes in the tree data structure and the header block comprises a root node in the tree data structure.

3. The method of claim 1, wherein encrypting the data blocks includes generating an is initialization vector for each data block and encrypting the data block using the initialization vector.

4. The method of claim 3, further comprising storing the initialization vector for each encrypted data block in the header block.

5. The method of claim 4, wherein the aggregate authentication value is generated based at least in part on the set of authentication values and the initialization vectors.

6. The method of claim 1, wherein:
the data blocks are encrypted using a first key; and
the authentication value for each encrypted data block is generated using a second key.

7. The method of claim 6, wherein the first key and the second key are derived from a master key.

8. The method of claim 1, further comprising: generating an updated aggregate authentication value based at least in part on the updated set of authentication values.

9. The method of claim 1, further comprising:
detecting a new data block;
encrypting the new data block;
generating an authentication value for the new data block;
updating the set of authentication values to include the authentication value for the changed block; and
generating an updated aggregate authentication value based at least in part on the set of authentication values including the authentication value for the new data block.

10. The method of claim 1, further comprising:
detecting a removal of a data block;
updating the set of authentication values to remove the authentication value for the removed block; and
generating an updated aggregate authentication value based at least in part on the updated set of authentication values.

11. The method of claim 1, wherein the tree further comprises:
authentication blocks comprising internal nodes in the tree data structure, wherein each authentication block includes authentication values associated with encrypted data blocks that are children of the authentication block.

12. The method of claim 11, wherein the set of authentication values included in the header block comprises authentication values for each of the authentication blocks.

13. The method of claim 1, wherein:
the tree further comprises a first level of authentication blocks and a second level of authentication blocks;
each first level authentication block includes authentication values for a set of second level authentication blocks that are children to the first level authentication block; and
each second level authentication block includes authentication values for a set of encrypted data blocks that are children of the second level authentication block.

14. The method of claim 13, wherein the set of authentication values in the header block comprises authentication values for each authentication block included in the first level of authentication blocks.

15. The method of claim 1, wherein the tree includes a number of levels of authentication blocks, wherein the number of levels is determined based at least in part on criteria including one or more of a size of the file, a file type associated with the file, and a content of the file.

16. The method of claim 1, wherein storing the encrypted data blocks comprises:

flattening the tree to generate a series of blocks including at least the header block and encrypted data blocks; and
storing the series of blocks.

17. The method of claim 16, wherein flattening the tree includes flattening the tree using depth-first pre-order traversal to generate the series of blocks.

18. A system, comprising:
a processor; and
a memory coupled with the processor, wherein the memory is configured to provide the processor with instructions which when executed cause the processor to:
  divide a file into a plurality of data blocks;
  encrypt the data blocks;
  generate an authentication value for each encrypted data block;
  store the encrypted data blocks in a tree data structure comprising:
    the encrypted data blocks; and
    a header block, the header block comprising a set of authentication values, each authentication value in the set of authentication values is derived from one or more of the encrypted data blocks, and an aggregate authentication value generated based at least in part on the set of authentication values;
  detect a change to a data block;
  encrypt the changed data block;
  generate an authentication value for the changed block; and
  update the set of authentication values to include the authentication value for the changed block, wherein:
    the tree further comprises a plurality of sub-trees below the header block, wherein each sub-tree includes one or more encrypted data blocks;
    the plurality of sub-trees includes a first sub-tree, a second sub-tree, and a third sub-tree;
    the first sub-tree comprises one or more encrypted data blocks that are children of the header block;
    the second sub-tree comprises one level of one or more authentication blocks and a level of one or more encrypted data blocks below the one level of authentication blocks;
    the third sub-tree comprises a first level of one or more authentication blocks below the header block, a second level of one or more authentication blocks below the first level, and one or more encrypted data blocks below the second level of authentication blocks; and
    the set of authentication values in the header block comprises: a first set of one or more authentication values for the encrypted data blocks in the first sub-tree, a second set of one or more authentication values for the authentication blocks included in the second sub-tree; and a third set of one or more authentication values for the first level of authentication blocks included in the third sub-tree.

19. A computer program product, the computer program product being embodied in a tangible non-transitory computer readable storage medium and comprising computer instructions for:
  dividing a file into a plurality of data blocks;
  encrypting the data blocks;
  generating an authentication value for each encrypted data block;
  storing the encrypted data blocks in a tree data structure comprising:
    the encrypted data blocks; and
    a header block, the header block comprising a set of authentication values, each authentication value in the set of authentication values is derived from one or more of the encrypted data blocks, and an aggregate authentication value generated based at least in part on the set of authentication values;
  detecting a change to a data block;
  encrypting the changed data block;
  generating an authentication value for the changed block; and
  updating the set of authentication values to include the authentication value for the changed block, wherein:
    the tree further comprises a plurality of sub-trees below the header block, wherein each sub-tree includes one or more encrypted data blocks;
    the plurality of sub-trees includes a first sub-tree, a second sub-tree, and a third sub-tree;
    the first sub-tree comprises one or more encrypted data blocks that are children of the header block;
    the second sub-tree comprises one level of one or more authentication blocks and a level of one or more encrypted data blocks below the one level of authentication blocks;
    the third sub-tree comprises a first level of one or more authentication blocks below the header block, a second level of one or more authentication blocks below the first level, and one or more encrypted data blocks below the second level of authentication blocks; and
    the set of authentication values in the header block comprises: a first set of one or more authentication values for the encrypted data blocks in the first sub-tree, a second set of one or more authentication values for the authentication blocks included in the second sub-tree; and a third set of one or more authentication values for the first level of authentication blocks included in the third sub-tree.

* * * * *

UNITED STATES PATENT AND TRADEMARK OFFICE
CERTIFICATE OF CORRECTION

PATENT NO. : 9,703,981 B1
APPLICATION NO. : 14/533006
DATED : July 11, 2017
INVENTOR(S) : Eric M. Marion It is certified that error appears in the above-identified patent and that said Letters Patent is hereby corrected as shown below:

In Column 22, Line 02, in Claim 3 after "generating an", delete "is"

Signed and Sealed this
Twentieth Day of February, 2018

Andrei Iancu
*Director of the United States Patent and Trademark Office*